(12) United States Patent
Park et al.

(10) Patent No.: US 10,809,214 B2
(45) Date of Patent: Oct. 20, 2020

(54) SMALL SIZE THERMAL PROBE SYSTEM FOR MEASURING THE THERMAL CONDUCTIVITY OF THE PELLET TYPE HYDROGEN STORAGE ALLOY

(71) Applicant: KOREA INSTITUTE OF ENERGY RESEARCH, Daejeon (KR)

(72) Inventors: Sang Il Park, Daejeon (KR); Chang-bog Ko, Daejeon (KR); Moon-sun Chung, Daejeon (KR); Jong-won Kim, Daejeon (KR); Won-chul Cho, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 229 days.

(21) Appl. No.: 15/862,580

(22) Filed: Jan. 4, 2018

(65) Prior Publication Data
US 2018/0284044 A1    Oct. 4, 2018

(30) Foreign Application Priority Data
Mar. 28, 2017   (KR) .......................... 10-2017-0039114

(51) Int. Cl.
*G01N 25/18* (2006.01)
*G01K 7/00* (2006.01)
*G01K 1/00* (2006.01)
*G01K 3/10* (2006.01)
*G01K 1/14* (2006.01)

(52) U.S. Cl.
CPC .............. *G01N 25/18* (2013.01); *G01K 1/14* (2013.01); *G01K 3/10* (2013.01)

(58) Field of Classification Search
USPC ................................. 374/44, 141, 208, 179
See application file for complete search history.

(56) References Cited

U.S. PATENT DOCUMENTS

2014/0010258 A1 *   1/2014   Hyun .................... G01N 25/18
374/44

FOREIGN PATENT DOCUMENTS

| JP | 56022943 | A | * | 3/1981 |
| JP | 2007147005 | A | | 6/2007 |
| JP | 2008196903 | A | | 8/2008 |
| KR | 1020120050243 | A | | 5/2012 |
| KR | 1020120060083 | A | | 6/2012 |

* cited by examiner

*Primary Examiner* — Mirellys Jagan
(74) *Attorney, Agent, or Firm* — Cantor Colburn LLP

(57) ABSTRACT

The present invention relates to a small size thermal conductivity measuring apparatus of a pellet type hydrogen storage alloy, a measuring method, and an analysis system. More specifically, a small size thermal conductivity measuring device of a hydrogen storage alloy pellet, includes: a measurement sample unit which is a target to be measured and is configured by a hydrogen storage alloy pellet; a reference material unit in which one surface is configured to be in contact with one surface of the measurement sample unit and a mounting groove is formed one side of the contact surface; and a thermal probe which is mounted in the mounting groove to measure a thermal conductivity of the measurement sample unit based on a temperature change.

11 Claims, 7 Drawing Sheets

SMALL SIZE THERMAL PROBE SYSTEM FOR MEASURING THE THERMAL CONDUCTIVITY OF THE PELLET TYPE HYDROGEN STORAGE ALLOY

CROSS-REFERENCE TO RELATED APPLICATIONS

This application claims the priority of Korean Patent Application No. 2017-0039114 filed on Mar. 28, 2017, in the Korean Intellectual Property Office, the disclosure of which is incorporated herein by reference.

BACKGROUND

Field

The present invention relates to a small size thermal conductivity measuring apparatus of a pellet type hydrogen storage alloy, a measuring method, and an analyzing system.

Description of the Related Art

In order to improve adsorption/desorption and storage performance of hydrogen in a hydrogen storage device which uses a hydrogen storage alloy, a pellet of a compressively molded hydrogen storage alloy may be mainly used instead for powder. In this case, when the compressed pellet is used, a volume of a storage device may be reduced. Further, an effective thermal conductivity of the storage alloy is increased and heating and cooling performances are improved so that the adsorption/desorption performance of hydrogen in the hydrogen storage device may be improved. Therefore, it is necessary to precisely measure an effective thermal conductivity of the hydrogen storage alloy.

However, an effective thermal conductivity of a compressively molded hydrogen storage alloy is mostly higher than that of powder. Therefore, it is more difficult to reduce a size of a sample. Further, there is still difficulty to directly install a thermal probe in the pellet.

Generally, a thin hole is formed in a solid pellet and a tube which fits the size of the hole is inserted into the hole to prepare a sample. Thereafter, a thermal probe in which a heater line and a thermocouple line are installed is installed into a tube and a gap between the thermal probe and the tube may be filled with thermal grease.

However, when a solid pellet of a hydrogen storage alloy is in contact with air, mostly a hydrogen storage material is oxidized. Therefore, the hydrogen storage material is stored in inert gas such as argon and processing such as molding is also performed under an inert gas atmosphere such as argon. Therefore, it is very difficult to form small holes in a pellet of the hydrogen storage alloy. Further, it is also difficult to perform press molding of a hydrogen storage alloy having very small holes in which a small thermal probe can be mounted.

However, according to the present invention, it is relatively easy to perform groove processing on a reference material which is an insulated and high temperature plastic and relatively precisely perform the processing. Further, it is relatively easy to mount a thermal probe in a groove of the reference material and process the gap with thermal grease. Furthermore, it is relatively easy to mold and produce a semi-cylindrical pellet of a hydrogen storage alloy having a flat surface which is a contact surface with the reference material and does not have a hole, using a press. Therefore, when a method of the present invention is used, it is possible to more precisely and simply measure a thermal conductivity of the hydrogen storage alloy.

Therefore, in order to measure an effective thermal conductivity of a hydrogen storage alloy pellet, a small size thermal conductivity measuring device of a hydrogen storage alloy pellet which may use a small thermal probe to reduce an amount of necessary measurement sample and easily adjust an atmosphere of gas around the measurement sample has been required.

RELATED ART DOCUMENT

Patent Document

Patent Document 1: Japanese Unexamined Patent Application Publication No. 2007-147005
Patent Document 2: Japanese Unexamined Patent Application Publication No. 2008-196903
Patent Document 3: Korean Unexamined Patent Application Publication No. 2012-0050243
Patent Document 4: Korean Unexamined Patent Application Publication No. 2012-0060083

SUMMARY

The present invention has been made an effort to provide a small size thermal conductivity measuring device of a hydrogen storage alloy pellet which uses a small thermal probe to measure an effective thermal conductivity of a hydrogen storage alloy pellet to reduce an amount of necessary measurement sample and easily adjust a gas atmosphere around the measurement sample, and provides a small thermal probe in a compressively molded hydrogen storage alloy having a high effective thermal conductivity by inserting a heater unit and a thermocouple unit in a mounting groove processed in a reference material unit and fixes and mounts the heater unit and the thermocouple unit using a thermal grease or a thermal adhesive, a measuring method, and an analyzing system.

The present invention has been made an effort to provide a small size thermal conductivity measuring device of a hydrogen storage alloy pellet which effectively measures an effective thermal conductivity of a hydrogen storage alloy pellet while reducing a volume of a sample of the hydrogen storage alloy and adjusting a temperature and a pressure of an ambient atmospheric gas and inserts an electric heater tube having a diameter of approximately 0.5 mm and a thermocouple tube having a diameter of approximately 0.25 mm into amounting groove processed on a surface of a reference material unit and fills the mounting groove with a thermal grease, fixes the measurement sample unit to an opposite side to measure a thermal conductivity of the measurement sample, so that it is possible to effectively measure a thermal conductivity for a sample smaller than a thermal probe of the related art having a diameter of approximately 1.2 mm or larger, a measuring method, and an analyzing system.

Other technical objects to be achieved in the present disclosure are not limited to the aforementioned technical objects, and other not-mentioned technical objects will be obviously understood by those skilled in the art from the description below.

A first object of the present disclosure may be achieved by a small size thermal conductivity measuring device of a hydrogen storage alloy pellet, including: a measurement sample unit which is a target to be measured and is configured by a hydrogen storage alloy pellet; a reference material unit in which one surface is configured to be in contact with one surface of the measurement sample unit and a mounting groove is formed in one side of the contact surface; and a thermal probe which is mounted in the mounting groove to measure a thermal conductivity of the measurement sample unit based on a temperature change.

Further, the measurement sample unit may be a compressively molded hydrogen storage alloy pellet and the reference material unit may be configured by an insulating material.

The measurement sample unit and the reference material unit may be semi-cylindrical and may be coupled to each other through a contact surface to have a cylindrical shape.

Further, the mounting groove may be configured by a first mounting groove which is formed along a length direction of the reference material unit and a second mounting groove which is connected to the first mounting groove in a radial direction and is formed along a length direction of the reference material unit and a heating unit may be mounted in the first mounting groove and a thermocouple unit which measures the temperature change may be mounted in the second mounting groove.

The heating unit may include a heater tube which is mounted in the first mounting groove to fit to the shape and a heater line which is provided in the heater tube to be heated by a supplied power, and the thermocouple unit may include a thermocouple tube which is mounted in the second mounting groove to fit to a shape thereof and a thermocouple sensor line which is provided in the thermocouple tube to measure a temperature change in real time.

The heater tube may be coupled to the first mounting groove through a thermal grease or thermal adhesive and the thermocouple tube may be coupled to the second mounting groove through the thermal grease or thermal adhesive.

A diameter of the heater tube may be 0.4 to 0.6 mm and a diameter of the thermocouple tube may be 0.2 to 0.3 mm.

A second object of the present disclosure is achieved by a small size thermal conductivity measuring method of a hydrogen storage alloy pellet, including: producing a measurement sample unit by forming a compressively molded hydrogen storage alloy pellet to have a semi-cylindrical shape and producing a semi-cylindrical reference material unit using an insulating material which is known of physical properties; mounting a heating unit in a first mount groove formed on one surface of the reference material unit and mounting a thermocouple unit in a second mounting groove; forming a complex by cylindrically coupling the reference material unit and the measurement sample unit; and heating the heating unit and measuring a temperature change of the measurement sample unit in real time by the thermocouple unit.

In the mounting, a heater tube in which a heater line is provided may be coupled to the first mounting groove through a thermal grease or thermal adhesive and a thermocouple tube in which a thermocouple sensor line is provided may be coupled to the second mounting groove through the thermal grease or thermal adhesive, and in the measuring, a power may be supplied to the heater line provided in the heater tube to be heated and the thermocouple sensor line may measure a temperature change in real time.

A third object of the present disclosure is achieved by a small size thermal conductivity analyzing system of a hydrogen storage alloy pellet, including: a chamber which includes an atmospheric gas inlet and a heating unit; the thermal conductivity measuring device according to the first object which is mounted in the chamber; a temperature sensor which measures a temperature in the chamber in real time; a pressure sensor which measures a pressure in the chamber in real time; a gas supplying unit which supplies an atmospheric gas into the chamber through the gas inlet; and an analyzing unit which analyzes an effective thermal conductivity of a measurement sample unit based on a temperature change measured by a thermal probe of the thermal conductivity measuring device.

The analyzing unit may measure an effective thermal conductivity of a complex based on the temperature change measured by the thermal probe and analyze an effectivity thermal conductivity of the measurement sample unit based on previously input correlation data between a reference material unit and a measurement sample unit.

The small size thermal conductivity analyzing system may further include: a control unit which controls the heating unit and a gas supplying unit based on values measured by the temperature sensor and the pressure sensor to adjust a temperature and a pressure in the chamber to be a predetermined temperature value and a predetermined pressure value.

The small size thermal conductivity analyzing system may further include: a database which stores the analyzed effective thermal conductivity of the measurement sample unit for a kind of the atmospheric gas, the predetermined temperature value, the predetermined pressure value, and a physical property of the reference material unit to create a database.

A fourth object of the present disclosure is achieved by a small size thermal conductivity analyzing method of a hydrogen storage alloy pellet, including: producing a measurement sample unit by forming a compressively molded hydrogen storage alloy pellet to have a semi-cylindrical shape and producing a semi-cylindrical reference material unit using an insulating material which is known of physical properties; coupling a heater tube in which a heater line is provided to the first mounting groove through a thermal grease or thermal adhesive and coupling a thermocouple tube in which a thermocouple sensor line is provided to the second mounting groove through the thermal grease or thermal adhesive: forming a complex by cylindrically coupling the reference material unit and the measurement sample unit; mounting the complex in a chamber including an atmospheric gas inlet and a heating unit; operating a gas supplying unit to inject an atmospheric gas into the chamber through a gas inlet and operating a heating unit to maintain the chamber to have a predetermined temperature value and a predetermined pressure value; heating a heater line by supplying a power to the heater line provided in the heater tube and measuring a temperature change in real time by the thermocouple sensor line; and analyzing an effective thermal conductivity of a measurement sample unit based on the measured temperature change, by an analyzing unit.

Further, in the analyzing, the analyzing unit may measure an effective thermal conductivity of a complex based on the temperature change measured by the thermal probe, and analyze an effective thermal conductivity of the measurement sample unit based on previously input correlation data between a reference material unit and a measurement sample unit.

The small size thermal conductivity analyzing method may further include: controlling the heating unit and a gas supplying unit based on a value measured by the temperature sensor and the pressure sensor, by a control unit, to adjust a temperature and a pressure in the chamber to be a predetermined temperature value and a predetermined pressure value.

The small size thermal conductivity analyzing method may further include: storing the analyzed effective thermal conductivity of the measurement sample unit for a kind of the atmospheric gas, the predetermined temperature value, the predetermined pressure value, and a physical property of the reference material unit, by a database, to create a database.

According to the exemplary embodiment of the present invention, a small size thermal probe is used to measure an effective thermal conductivity of a hydrogen storage alloy pellet, so that an amount of necessary measuring sample is reduced and a gas atmosphere around the measurement sample is easily adjusted. Further, a heater unit and a thermocouple unit are inserted in a mounting groove processed in the reference material unit and are fixed and mounted using a thermal grease or thermal adhesive to provide a small size thermal probe for a compressively molded hydrogen storage alloy having a high effective thermal conductivity.

According to an exemplary embodiment of the present invention, an effective thermal conductivity of a hydrogen storage alloy pellet is effectively measured while reducing a volume of a sample of the hydrogen storage alloy and adjusting a temperature and a pressure of an ambient atmospheric gas. Further, when an electric heater tube having a diameter of approximately 0.5 mm and a thermocouple tube having a diameter of approximately 0.25 mm are inserted into amounting groove processed on a surface of a reference material unit and are filled with a thermal grease and a measurement sample unit is fixed to an opposite side to measure a thermal conductivity of the measurement sample, it is possible to effectively measure a thermal conductivity for a sample smaller than a thermal probe of the related art having a diameter of approximately 1.2 mm or larger.

The effects to be achieved by the present disclosure are not limited to aforementioned effects and other effects, which are not mentioned above, will be apparently understood by those skilled in the art from the following description.

BRIEF DESCRIPTION OF THE DRAWINGS

The accompanying drawings in the specification illustrate an exemplary embodiment of the present disclosure and the technical spirit of the present disclosure will be more clearly understood from the following detailed description taken in conjunction with the accompanying drawings. Therefore, the present invention will not be interpreted to be limited to the drawings, in which.

DETAILED DESCRIPTION OF THE PREFERRED EMBODIMENT

Figure 1:
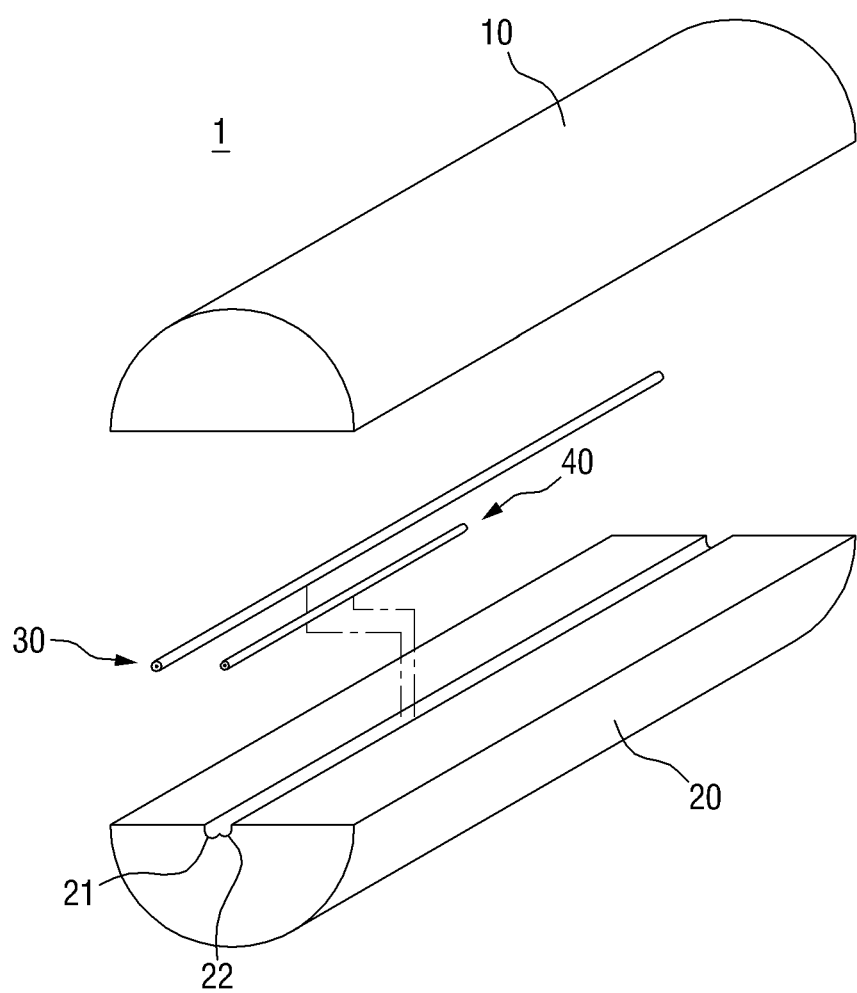
FIG. 1 is an exploded perspective view of a small size thermal conductivity measuring device of a hydrogen storage alloy pellet according to an exemplary embodiment of the present invention.

The above and other objects, features and other advantages of the present disclosure will be more clearly understood from the following detailed description taken in conjunction with the accompanying drawings. As those skilled in the art would realize, the present disclosure is not limited to the described embodiments, but may be embodied in different ways. On the contrary, exemplary embodiments introduced herein are provided to make disclosed contents thorough and complete and sufficiently transfer the spirit of the present invention to those skilled in the art.

In this specification, when a component is referred to as being "on" another component, it may be directly on the other component, or intervening third component may be present. Further, in the drawings, the thicknesses of components are exaggerated for effectively describing the technical contents.

Exemplary embodiments described in this specification may be described with reference to cross-sectional views and/or plan views which are ideal exemplary views of the present disclosure. Further, in the drawings, the thicknesses of film and regions are exaggerated for effectively describing the technical contents. Therefore, a shape of the exemplary view may be modified by a producing technology and/or an allowable error. Accordingly, exemplary embodiments of the present disclosure are not limited to specific illustrated types but may include modified types which are generated in accordance with the producing process. For example, a region illustrated to have a right angle may be rounded or have a predetermined curvature. Therefore, regions illustrated in the drawings have properties. Shapes of the regions illustrated in the drawings are provided to illustrate a specific shape of a region of an element, but not limit the scope of the present disclosure. Although the terms "first", "second", and the like are used for describing various components, these components are not confined by these terms. These terms are merely used for distinguishing one component from the other components. Exemplary embodiments described herein include complementary embodiments thereof.

The terms used in the present specification are for explaining the embodiments rather than limiting the present invention. Unless particularly stated otherwise in the present specification, a singular form also includes a plural form. The term "comprises" and/or "comprising" used in this specification does not exclude the existence or addition of one or more other components.

When the following specific exemplary embodiments are described, various specific contents are provided for more specific description and understanding of the present disclosure. However, those skilled in the art may understand that the specific exemplary embodiment may be described without using the various specific contents. In some cases, a configuration which is generally known and does not directly relate to the present disclosure will be omitted in order to avoid confusion.

Hereinafter, a configuration and a function of a small size thermal conductivity measuring device 1 of a hydrogen storage alloy pellet according to an exemplary embodiment of the present invention will be described.

Figure 2:
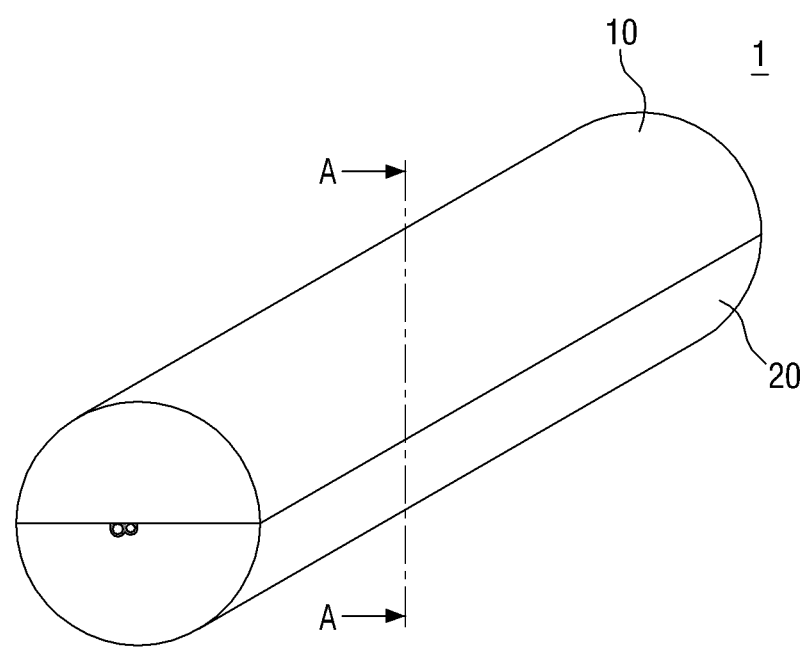
FIG. 2 is a perspective view of a small size thermal conductivity measuring device of a hydrogen storage alloy pellet according to an exemplary embodiment of the present invention.
Figure 3:
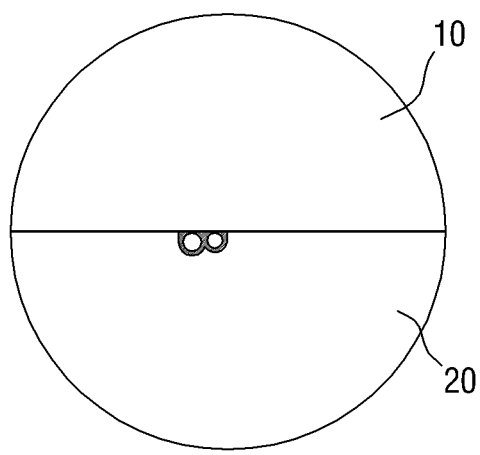
FIG. 3 is a cross-sectional view taken along the line A-A of FIG. 2.
Figure 4:
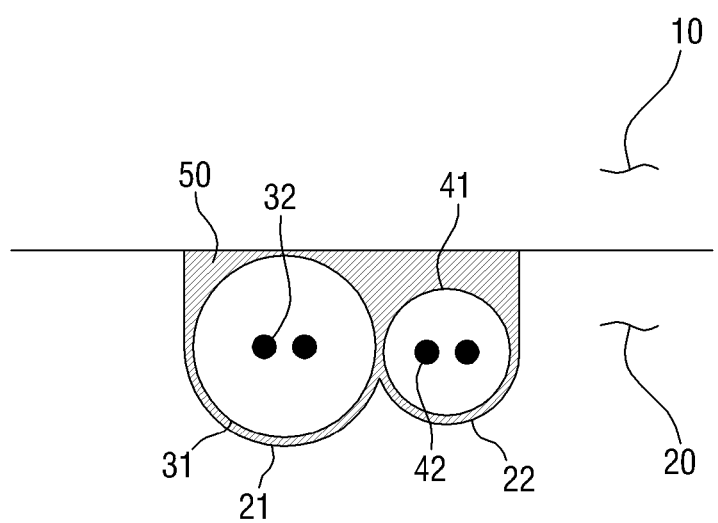
FIG. 4 is a partially enlarged view of FIG. 3.

First, FIG. 1 illustrates an exploded perspective view of a small size thermal conductivity measuring device 1 of a hydrogen storage alloy pellet according to an exemplary embodiment of the present invention. Further, FIG. 2 illustrates a perspective view of a small size thermal conductivity measuring device 1 of a hydrogen storage alloy pellet according to an exemplary embodiment of the present invention. FIG. 3 illustrates a cross-sectional view taken along the line A-A of FIG. 2 and FIG. 4 illustrates a partially enlarged view of FIG. 3.

As illustrated in FIG. 1, it is understood that a small size thermal conductivity measuring device 1 of a hydrogen storage alloy pellet generally includes a measurement sample unit 10 which is a target to be measured, a reference material unit 20, and a thermal probe.

The measurement sample unit 10 is a target for measuring an effective thermal conductivity and is configured by a compressively molded hydrogen storage alloy pellet. Further, as illustrated in FIGS. 1 and 2, the measurement sample unit 10 is configured to have a semi-cylindrical shape which is solid.

The reference material unit 20 is configured by an insulating material which is known in advance of physical properties such as a specific heat, a thermal conductivity, and a density and is configured to have a semi-cylindrical shape which is solid. As illustrated in FIG. 2, it is understood that one plane of the measurement sample unit 10 and one plane of the reference material unit 20 are in face contact with each other to be coupled to each other and a coupled shape is cylindrical.

A mounting groove is formed in a contact surface of the reference material unit 20 along a length direction. The thermal probe is mounted in the mounting groove to measure a thermal conductivity of the measurement sample unit 10.

More specifically, the mounting groove which is formed in the contact surface of the reference material unit 20 may be configured by a first mounting groove 21 which is formed along a length direction of the reference material unit 20 and a second mounting groove 22 which is connected to the first mounting groove 21 in a radial direction of the reference material unit 20 and is formed along the length direction of the reference material unit 20.

Further, it is understood that the heating unit 30 is mounted in the first mounting groove 21 and the thermocouple unit 40 which measures a temperature change is mounted in the second mounting groove 22. More specifically, as illustrated in FIG. 4, it is understood that the heating unit 30 includes a heater tube 31 which is mounted in the first mounting groove 21 to be fitted to a shape of the first mounting groove 21 and a heater line 32 which is provided in the heater tube 31 and is heated by a power supplied by a power supplying unit 33 and the thermocouple unit 40 includes a thermocouple tube 41 which is mounted in the second mounting groove 22 to be fitted to a shape of the second mounting groove 22 and a thermocouple sensor line 42 which is provided in the thermocouple tube 41 to measure a temperature change in real time.

Further, as illustrated in FIG. 4, the heater tube 31 is coupled to the first mounting groove 21 through a thermal grease or thermal adhesive 50 and the thermocouple tube 41 is coupled to the second mounting groove 22 through the thermal grease or thermal adhesive 50.

A diameter of the heater tube 31 is approximately 0.4 to 0.6 mm and a diameter of the thermocouple tube 41 is approximately 0.2 to 0.3 mm. Therefore, it is possible to efficiently measure a thermal conductivity of a sample which is smaller than a thermal probe of the related art having a diameter of approximately 1.2 mm or larger.

A small size thermal conductivity measuring method of a hydrogen storage alloy pellet according to an exemplary embodiment of the present invention produces a measurement sample unit 10 by forming a compressively molded hydrogen storage alloy pellet to have a semi-cylindrical shape and produces a semi-cylindrical reference material unit 20 using an insulating material which is known of physical properties. As mentioned above, a first mounting groove 21 and a second mounting groove 22 are processed on the contact surface of the reference material unit 20.

A heating unit 30 is mounted in the first mounting groove 21 which is formed in the contact surface of the reference material unit 20 and a thermocouple unit 40 is mounted in the second mounting groove 22. That is, a heater tube 31 in which a heater line 32 is provided is coupled to the first mounting groove 21 through a thermal grease or thermal adhesive 50 and the thermocouple tube 41 in which the thermocouple sensor line is provided is coupled to the second mounting groove 22 through the thermal grease or thermal adhesive 50.

The reference material unit 20 and the measurement sample unit 10 are cylindrically coupled to form a cylindrical complex. A power is supplied to the heater line 32 provided in the heater tube 31 through a power supplying unit 33 to heat the heater line and a temperature change is measured by the thermocouple sensor line 42 in real time.

Figure 5:
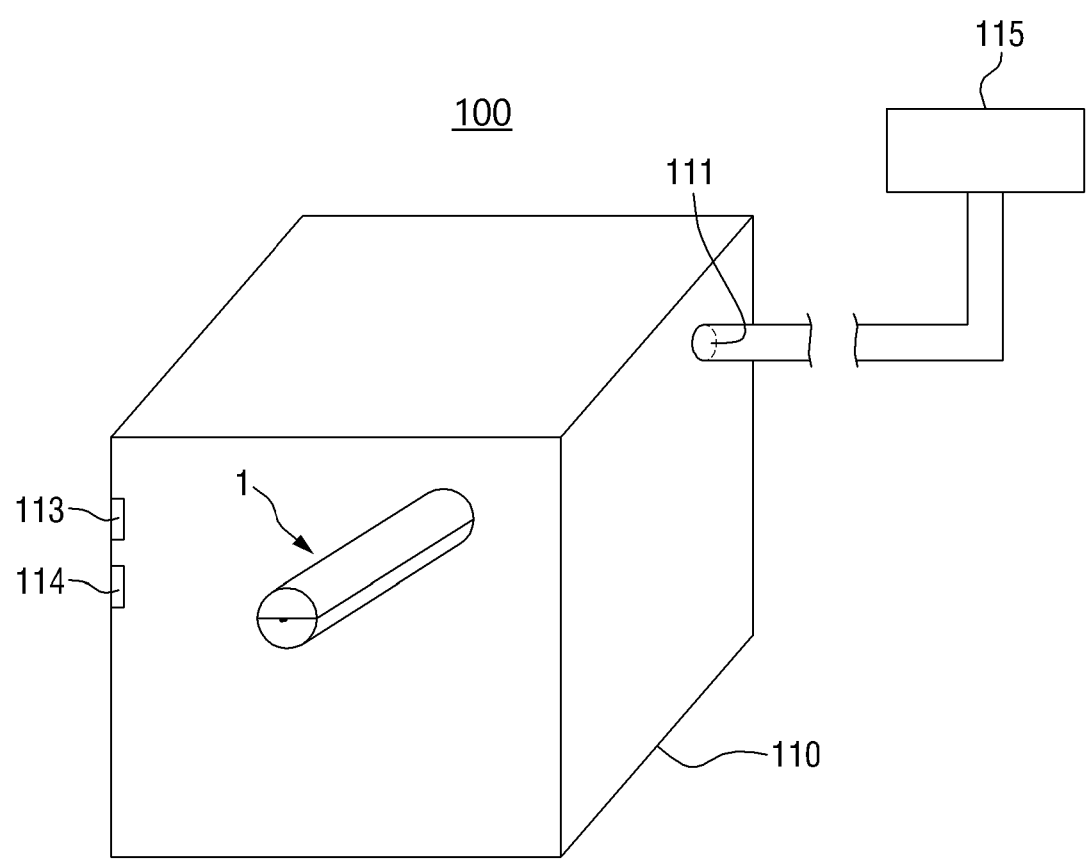
FIG. 5 is a diagram of a small size thermal conductivity analyzing system of a hydrogen storage alloy pellet according to an exemplary embodiment of the present invention.
Figure 6:
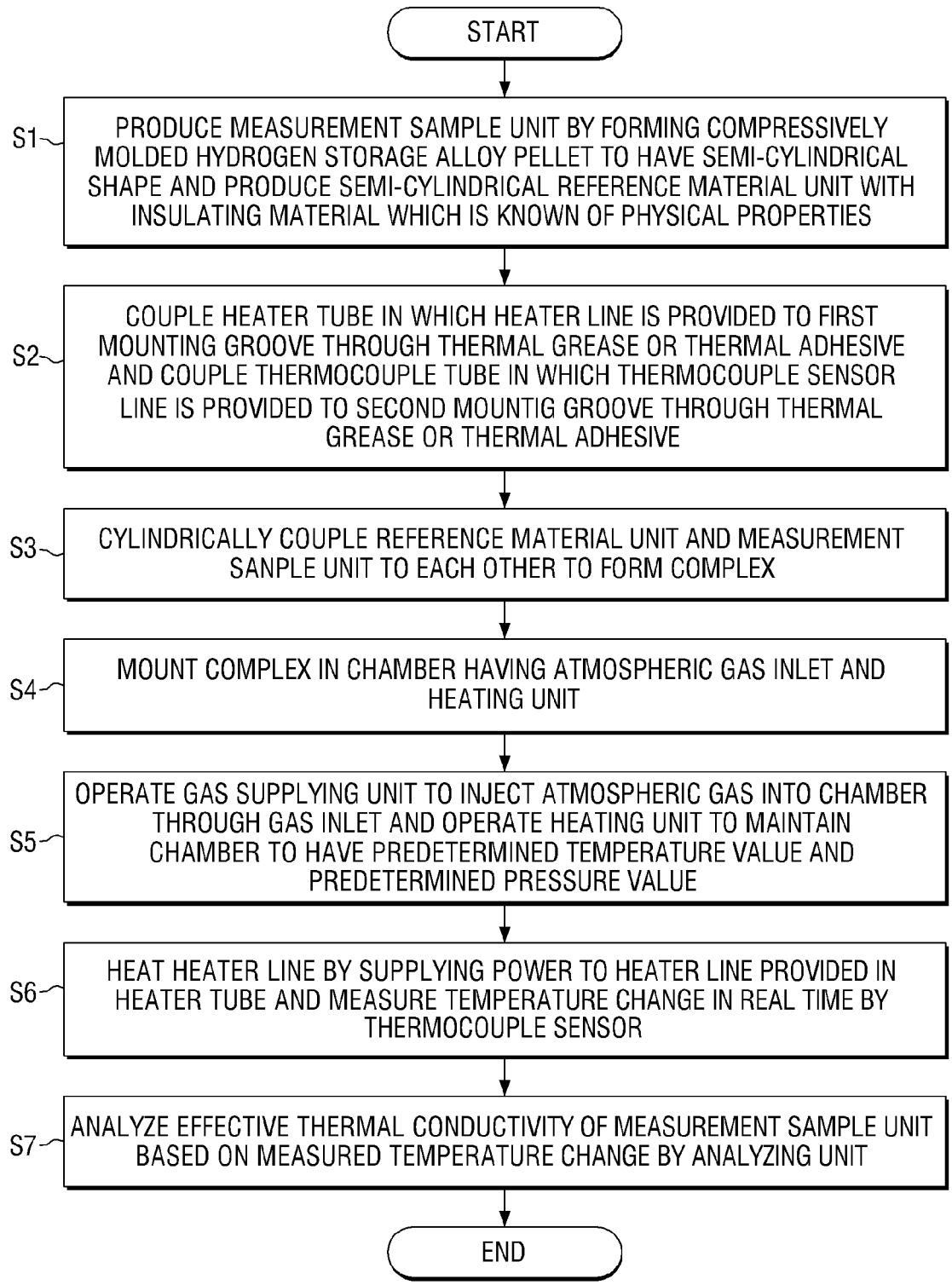
FIG. 6 is a flowchart of a small size thermal conductivity analyzing method of a hydrogen storage alloy pellet according to an exemplary embodiment of the present invention.
Figure 7:
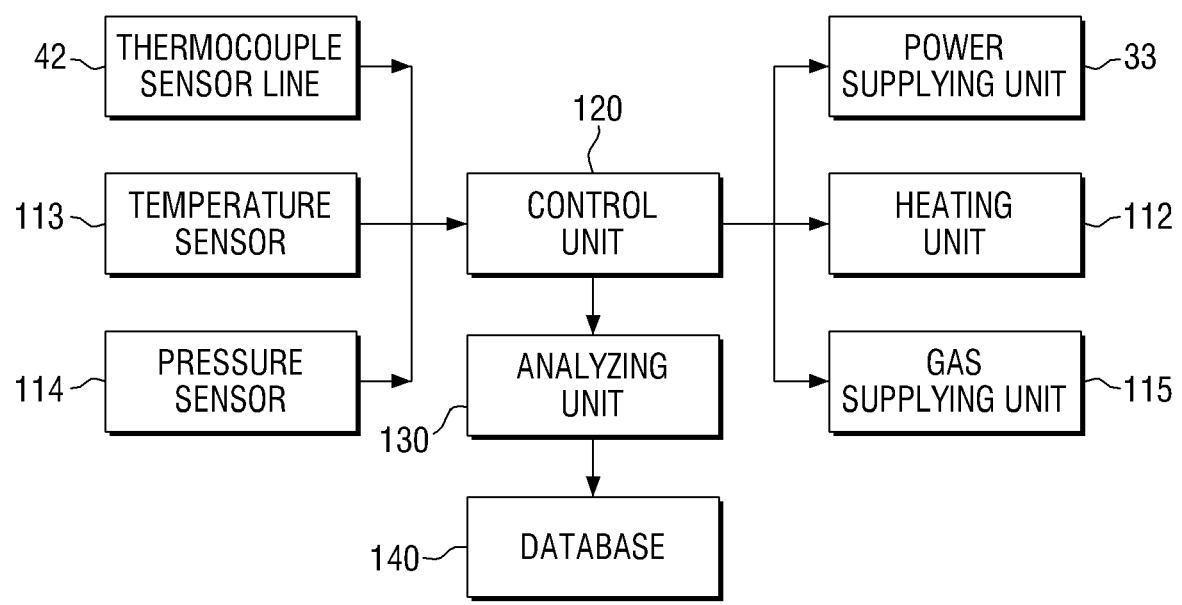
FIG. 7 is a block diagram illustrating a signal flow of a control unit according to an exemplary embodiment of the present invention.

Hereinafter, a configuration and an analyzing method of a small size thermal conductivity analyzing system 100 of a hydrogen storage alloy pellet according to an exemplary embodiment of the present invention will be described. Further, FIG. 5 illustrates a diagram of a small size thermal conductivity analyzing system 100 of a hydrogen storage alloy pellet according to an exemplary embodiment of the present invention. FIG. 6 illustrates a flowchart of a small size thermal conductivity analyzing method of a hydrogen storage alloy pellet according to an exemplary embodiment of the present invention. FIG. 7 illustrates a block diagram illustrating a signal flow of a control unit 120 according to an exemplary embodiment of the present invention.

A small size thermal conductivity analyzing system 100 of a hydrogen storage alloy pellet according to an exemplary embodiment of the present invention includes a chamber 110, a complex of the above-mentioned thermal conductivity measuring device 1, a pressure sensor 114, a temperature sensor 113, a gas supplying unit 115, and an analyzing unit 130.

The chamber 110 includes an atmospheric gas inlet 111 and a heating unit 112 and the thermal conductivity measuring device 1 is mounted in the chamber 110. The temperature sensor 113 measures a temperature in the chamber 110 in real time and the pressure sensor 114 measures a pressure in the chamber 110 in real time.

The gas supplying unit 115 supplies an atmospheric gas in the chamber 110 through the gas inlet 111. The atmospheric gas may be argon gas or hydrogen gas and adjust an atmospheric temperature and a gas pressure.

Further, the analyzing unit 130 analyzes an effective thermal conductivity of the measurement sample unit 10 based on the temperature change measured by the thermal probe of the thermal conductivity measuring device 1.

More specifically, the analyzing unit 130 measures an effective thermal conductivity of the complex based on the temperature change measured by the thermal probe. The analyzing unit analyzes the effective thermal conductivity of the measurement sample unit 10 based on previously input correlation data between the reference material unit 20 and the measurement sample unit 10. That is, the analyzing unit analyzes the effective thermal conductivity of the measurement sample unit 10 through theoretical electro-thermal analysis calculation of a measurement value of the thermal conductivity of the complex according to the thermal conductivity, the specific heat, and the density of each measurement sample unit 10.

Further, as illustrated in FIG. 7, it is understood that the control unit 120 controls the heating unit 112 and the gas supplying unit 115 based on a value measured by the temperature sensor 113 and the pressure sensor 114 to adjust the atmospheric temperature and the pressure in the chamber 110 to be a predetermined temperature value and a predetermined pressure value.

The analyzed effective thermal conductivity of the measurement sample unit 10 is stored for a kind of the atmospheric gas, the predetermined temperature value, the predetermined pressure value, and every physical property of the reference material unit 20 to create a database.

Hereinafter, a small size thermal conductivity analyzing method of a hydrogen storage alloy pellet according to an exemplary embodiment of the present invention will be described.

First, the measurement sample unit 10 is produced by forming the compressively molded hydrogen storage alloy pellet to have a semi-cylindrical shape and a semi-cylindrical reference material unit 20 is produced with an insulating material which is known of physical properties (S1).

Further, a heater tube 31 in which a heater line 32 is provided is coupled to the first mounting groove 21 through a thermal grease or thermal adhesive and the thermocouple tube 41 in which the thermocouple sensor line 42 is provided is coupled to the second mounting groove 22 through the thermal grease or thermal adhesive (S2).

The reference material unit 20 and the measurement sample unit 10 are cylindrically coupled to form a complex (S3). The complex is mounted in a chamber 110 (S4).

A gas supplying unit 115 operates to inject an atmospheric gas in the chamber 110 through a gas inlet 111 and a heating unit 112 operates to maintain the chamber 110 to have a predetermined temperature value and a predetermined pressure value (S5). Further, the control unit 120 controls the heating unit 112 and the gas supplying unit 115 based on values measured by the temperature sensor 113 and the pressure sensor 114 to adjust the atmospheric temperature and the pressure in the chamber 110 to be a predetermined temperature value and a predetermined pressure value.

A power is supplied to the heater line 32 provided in the heater tube 31 through a power supplying unit 33 to heat the heater line and the thermocouple sensor line 42 measures a temperature change in real time (S6).

An analyzing unit 130 analyzes the effective thermal conductivity of the measurement sample unit 10 based on the measured temperature change (S7). That is, the analyzing unit 130 measures the effective thermal conductivity of the complex based on the temperature change measured by the thermal probe and analyzes the effective thermal conductivity of the measurement sample unit 10 based on previously input correlation data between the reference material unit 20 and the measurement sample unit 10.

The analyzed effective thermal conductivity of the measurement sample unit 10 is stored for a kind of the atmospheric gas, the predetermined temperature value, the predetermined pressure value, and every physical property of the reference material unit 20 through a database 140 to make a database.

In the apparatus and the method thereof described above, the configuration and method of embodiments as described above may not be applied with limitation, but the embodiments may be configured by selectively combining all or a part of each embodiment such that various modifications may be made.

What is claimed is:

1. A small size thermal conductivity measuring device of a hydrogen storage alloy pellet, comprising:
    a measurement sample unit which is a target to be measured and is configured by a hydrogen storage alloy pellet;
    a reference material unit, one surface of which is configured to be in contact with one surface of the measurement sample unit, wherein a mounting groove is formed in one side of the one surface of the reference material unit; and
    a thermal probe which is mounted in the mounting groove to measure a thermal conductivity of the measurement sample unit based on a temperature change.

2. The small size thermal conductivity measuring device according to claim 1, wherein the measurement sample unit is a compressively molded hydrogen storage alloy pellet and the reference material unit is configured by an insulating material.

3. The small size thermal conductivity measuring device according to claim 2, wherein the measurement sample unit and the reference material unit are semi-cylindrical and are coupled to each other through a contact surface to have a cylindrical shape.

4. The small size thermal conductivity measuring device according to claim 3, wherein the mounting groove is configured by a first mounting groove which is formed along a length direction of the reference material unit and a second mounting groove which is connected to the first mounting groove in a radial direction and is formed along a length direction of the reference material unit and a heating unit is mounted in the first mounting groove and a thermocouple unit which measures the temperature change is mounted in the second mounting groove.

5. The small size thermal conductivity measuring device according to claim 4, wherein the heating unit includes a heater tube which is mounted in the first mounting groove to be fitted to a shape of the first mounting groove and a heater line which is provided in the heater tube to be heated by a supplied power, and the thermocouple unit includes a thermocouple tube which is mounted in the second mounting groove to fit to a shape thereof and a thermocouple sensor line which is provided in the thermocouple tube to measure the temperature change in real time.

6. The small size thermal conductivity measuring device according to claim 5, wherein the heater tube is coupled to the first mounting groove through a thermal grease or thermal adhesive and the thermocouple tube is coupled to the second mounting groove through the thermal grease or thermal adhesive.

7. The small size thermal conductivity measuring device according to claim 6, wherein a diameter of the heater tube is 0.4 to 0.6 mm and a diameter of the thermocouple tube is 0.2 to 0.3 mm.

8. A small size thermal conductivity analyzing system of a hydrogen storage alloy pellet, comprising:
    a chamber which includes an atmospheric gas inlet and a heating unit;
    the thermal conductivity measuring device according to claim 1, which is mounted in the chamber;

a temperature sensor which measures a temperature in the chamber in real time;

a pressure sensor which measures a pressure in the chamber in real time;

a gas supplying unit which supplies an atmospheric gas into the chamber through the gas inlet; and an analyzing unit which analyzes an effective thermal conductivity of the measurement sample unit based on the temperature change measured by the thermal probe of the thermal conductivity measuring device.

9. The small size thermal conductivity analyzing system according to claim 8, wherein the analyzing unit measures an effective thermal conductivity of a complex based on the temperature change measured by the thermal probe and analyzes the effective thermal conductivity of the measurement sample unit based on previously input correlation data between the reference material unit and the measurement sample unit, and the complex is a cylindrical couple of the reference material unit and the measurement sample unit.

10. The small size thermal conductivity analyzing system according to claim 9, further comprising:

a control unit which controls the heating unit and the gas supplying unit based on values measured by the temperature sensor and the pressure sensor to adjust a temperature and a pressure in the chamber to be a predetermined temperature value and a predetermined pressure value.

11. The small size thermal conductivity analyzing system according to claim 10, further comprising:

a database which stores the analyzed effective thermal conductivity of the measurement sample unit for a kind of the atmospheric gas, the predetermined temperature value, the predetermined pressure value, and a physical property of the reference material unit to create a database.

* * * * *